US012704656B2

(12) United States Patent
Marchais et al.

(10) Patent No.: US 12,704,656 B2
(45) Date of Patent: Aug. 11, 2026

(54) METHOD FOR ASSESSING THE URANIUM CONTENT IN A BOREHOLE USING GAMMA SPECTROMETRY AND ASSOCIATED DEVICE

(71) Applicants: Orano Mining, Chatillon (FR); Commissariat à l'énergie atomique et aux énergies alternatives, Paris (FR)

(72) Inventors: Thomas Marchais, Saint-Paul-lez-Durance (FR); Bertrand Perot, Venelles (FR); Pierre-Guy Allinei, Peyrius (FR); Hervé Toubon, Les Essarts-le-Roi (FR); Youcef Bensedik, Tours (FR)

(73) Assignees: ORANO MINING, Chatillon (FR); COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 94 days.

(21) Appl. No.: 18/689,410

(22) PCT Filed: Sep. 5, 2022

(86) PCT No.: PCT/EP2022/074644
§ 371 (c)(1),
(2) Date: Mar. 5, 2024

(87) PCT Pub. No.: WO2023/031465
PCT Pub. Date: Mar. 9, 2023

(65) Prior Publication Data

US 2025/0004160 A1 Jan. 2, 2025

(30) Foreign Application Priority Data

Sep. 6, 2021 (FR) ...................................... 2109325

(51) Int. Cl.
*G01V 5/06* (2006.01)
*E21B 49/00* (2006.01)
*G01T 1/202* (2006.01)

(52) U.S. Cl.
CPC ................ *G01V 5/06* (2013.01); *E21B 49/00* (2013.01); *G01T 1/202* (2013.01)

(58) Field of Classification Search
None
See application file for complete search history.

(56) References Cited

U.S. PATENT DOCUMENTS

| | | | |
|---|---|---|---|
| 3,070,880 | A | 1/1963 | Davis et al. |
| 3,297,543 | A | 1/1967 | Jessen et al. |
| 2015/0340110 | A1 | 11/2015 | Stepnik et al. |

FOREIGN PATENT DOCUMENTS

| | | |
|---|---|---|
| WO | WO2021122772 A1 | 6/2021 |

OTHER PUBLICATIONS

International Search Report for PCT/EP2022/074644.

(Continued)

*Primary Examiner* — Edwin C Gunberg
(74) *Attorney, Agent, or Firm* — Davidson Kappel LLC

(57) ABSTRACT

A method for assessing the uranium content in a region of interest of a subsoil using gamma spectrometry includes acquiring at least one energy spectrum of gamma radiation associated with the region of interest. The energy spectrum includes at least one low-energy band, one high-energy band, a contribution of the self-attenuation of uranium in the low-energy band being greater than a contribution of the self-attenuation of uranium in the high-energy band. The method also includes assessing the uranium content in the region of interest using the area of the low-energy band, the (Continued)

area of the high-energy band of the energy spectrum acquired in the region of interest and at least two calibration coefficients.

12 Claims, 4 Drawing Sheets

(56) References Cited

OTHER PUBLICATIONS

Search Report FR2109325.
Thomas Marchais: Optimisation des Measures de Spectrometrie Gamma Pour la Prospection de L'Uranium, HAL Open Science, Nov. 16, 2019, pp. 1-205, URL:https://tel.archives-ouvertes.fr/tel-02366534/document , p. 35.

114
116
112
118
120
125
122
130
132
128
126
124
108
106
100
104
110
21
18
20
22
12
10
102
11
14
16

METHOD FOR ASSESSING THE URANIUM CONTENT IN A BOREHOLE USING GAMMA SPECTROMETRY AND ASSOCIATED DEVICE

CROSS-REFERENCE TO RELATED APPLICATIONS

This application is the U.S. National Phase of PCT Appl. No. PCT/EP2022/074644 filed Sep. 5, 2022, which claims priority to FR 21 09325, filed Sep. 6, 2021, the entire disclosures of which are incorporated by reference herein.

TECHNICAL FIELD

The present disclosure first relates to a method for assessing the uranium content in at least one region of interest of a subsoil using gamma spectrometry, the region of interest being crossed through by a borehole.

BACKGROUND

The present disclosure further relates to a device for assessing the uranium content in an associated region of interest.

SUMMARY

Uranium occurs naturally in the form of three isotopes: $^{238}U$, $^{235}U$ and $^{234}U$, the latter being derived from the disintegration chain of $^{238}U$. $^{238}U$ is largely the predominant and represents more than 99.3% by mass fraction of total uranium.

$^{238}U$ and $^{235}U$ successively disintegrate into different chemical elements called daughter elements until the resulting chemical element is stable. Each disintegration is most often accompanied by the emission of high-energy photons also called X or gamma radiation the energy spectrum of which is typically comprised between a few tens of keV and more than 2000 keV. The unit of measurement of radiation is expressed in counts per unit of time, e.g. counts per second.

In mining exploration, it is known how to use gamma radiation emitted by geological formations to characterize the latter and more particularly the uranium content of geological formations in the subsoil. Such type of measurement is carried out in particular in a borehole. Such measurements typically characterize the uranium potential of a region. When a deposit is discovered, borehole gamma radiation measurements are also used to estimate uranium reserves in the deposit. The accuracy of such measurements and the processing that is done to obtain the associated concentrations of uranium are hence critical.

Conventionally, in a borehole, the total gamma radiation is measured over the entire energy spectrum, in the form of a total count, throughout the borehole, by moving a scintillator detector. The scintillator detector comprises e.g. a sodium iodide (NaI) crystal. The method works relatively well when there is a balance between the different parent-to-daughter chains of uranium. In such a case, the total gamma radiation is substantially proportional to the uranium content of the formation. A calibration coefficient, specific to the gamma radiation detector, relates the total radiation measured to the uranium content of the formation. The calibration coefficient is obtained by simulation or other experimentally from standard samples.

However, in the case of an imbalance in uranium parent-to-daughter chains, the method leads to an underestimate or to an overestimate of the uranium content in geological formations. Such an imbalance is generally observed for deposits with a low uranium content subject to differential leaching phenomena (e.g. uranium deposit such as "roll fronts") between the "uranium" (top of the natural radioactive chain of the $^{238}U$) and radium (bottom of the same chain) groups which form a significant part of the uranium deposits mined in the world.

Instead of performing an in-situ borehole measurement, it is possible to extract an ore core in order to quantify the content and imbalance of mineralized zones using conventional gamma spectrometry. A high-resolution gamma spectrometry measurement is then performed on the core.

The disadvantage of the method is that the measurement cannot be used to characterize the entire ore zone (typically several tens of meters) but only the extracted core. As a result, the true content of the deposit may be biased. In addition, extracting the core, then measuring the core in situ or even sending the core to a laboratory make the measurement longer and more expensive than a borehole measurement. The measurement of the 1001 keV line characteristic of uranium alone requires several hours of acquisition in a case of low uranium content (less than 1000 ppm) and the measurement of the $^{234}Th$ line (top of the chain), which is faster, may, however, be subject to significant attenuation phenomena if there is a uranium nugget.

FR 3 088 445 presents a method for quantifying the imbalance and the uranium content of a sample by measuring two specific energy bands in an energy spectrum of gamma radiation. The first energy band comprises a characteristic signal of uranium and of radium, the second energy band being almost exclusively characteristic of radium.

Such method however cannot characterize all uranium contents for any imbalance. Indeed, for very strong imbalances, the uranium signal is embedded in the radium signal, which makes the extraction thereof difficult.

A goal of the present disclosure is to overcome such drawbacks by proposing a method for assessing the uranium content of at least one region of interest of a subsoil crossed through by a borehole which leads to obtaining precise uranium content values, even when the latter are low and the radioactive imbalance of uranium is significant.

To this end, the present disclosure relates to a method for assessing the uranium content in at least one region of interest of a subsoil using gamma spectrometry, the region of interest being crossed through by a borehole, the method comprising the following steps:

a) acquiring at least one energy spectrum of gamma radiation associated with the region of interest, the energy spectrum comprising at least one low-energy band, one high-energy band, a contribution of the self-attenuation of uranium in the low-energy band being greater than a contribution of the self-attenuation of uranium in the high-energy band, b) assessing the uranium content in the region of interest using the area of the low-energy band, the area of the high-energy band of the energy spectrum acquired in the region of interest and at least two calibration coefficients.

Thereby, the method according to the present disclosure serves to reliably assess low uranium contents of subsurface formations in a borehole, in particular in the presence of strong radioactive imbalances of uranium, typically very much lower than 1, and including for low uranium contents.

According to other particular embodiments, the method comprises one or more of the following features, taken individually or according to all technically possible combinations:

the contribution of the self-attenuation of uranium in the low-energy band is the main contribution in the said low-energy band;

the contribution of the self-attenuation of uranium in the high-energy band is substantially zero;

the low-energy band comprises a lower bound and an upper bound, the lower bound being greater than 98 keV so as to avoid a contribution from uranium fluorescence X-ray radiation in the low-energy band;

the low-energy band is substantially comprised between 120 keV and 170 keV and the high-energy band is substantially comprised between 960 keV and 1046 keV;

the uranium content in the region of interest is related to the ratio between the surface area of the low-energy band and the surface area of the high-energy band by a polynomial equation of the first degree of the form $C_{BE}/C_{HE}=\beta-\alpha\times C_{mU}$ or by a polynomial equation of the second degree of the form $C_{BE}/C_{HE}=\alpha'\times C_{mU}^2-\beta'\times C_{mU}+\gamma'$, $C_{BE}$ being the area of the low-energy band of the energy spectrum, $C_{HE}$ being the area of the high-energy band of the energy spectrum, $C_{mU}$ being the uranium content, α, β, α', β', γ' being the calibration coefficients, the method comprises a step of determining the calibration coefficients by modeling or using calibration blocks;

the method comprises a step of determining the calibration coefficients in a borehole, the subsoil comprising at least a first calibration region and a second calibration region crossed through by the borehole, said determination step comprising:

acquiring at least a first and a second calibration energy spectrum of gamma radiation in the first and second calibration regions, respectively, each of the calibration energy spectra comprising at least one low-energy band, one high-energy band, and an energy band centered on a 1001 keV energy line of $^{234m}$Pa, calculating a first uranium content in the first calibration region and a second uranium content in the second calibration region using the energy band centered on the 1001 keV energy line of $^{234m}$Pa of the first calibration energy spectrum of gamma radiation and of the second calibration energy spectrum of gamma radiation respectively, calculating at least a first ratio and a second ratio between the surface area of the low-energy band and the surface area of the high-energy band of the first calibration energy spectrum and of the second calibration energy spectrum, respectively, and calculating the calibration coefficients from at least the first and second calculated concentrations of uranium and from at least the first and second calculated ratios.

The present disclosure further relates to a device for assessing a uranium content of a region of interest of a subsoil using gamma spectrometry, the region of interest being traversed by a borehole, the device comprising:

a spectrometric probe including a scintillator detector, an acquisition module connected to the spectrometric probe, the acquisition module being configured to acquire at least one energy spectrum of gamma radiation associated with the region of interest, the energy spectrum comprising at least one low-energy band, one high-energy band, a contribution of the self-attenuation of uranium in the low-energy band being greater than a contribution of the self-attenuation of uranium in the high-energy band, an assessment module for the uranium content configured to assess the uranium content of the region of interest using the surface area of the low-energy band, the surface area of the high-energy band of the acquired energy spectrum in the region of interest and at least two calibration coefficients.

According to a particular embodiment, the device further comprises a module for determining the calibration coefficients configured to determine the calibration coefficients, the subsoil comprising at least a first calibration region and a second calibration region crossed through by the borehole, the acquisition module being configured to acquire at least a first calibration energy spectrum of gamma radiation associated with the first calibration region, a second calibration spectrum associated with the second calibration region and an energy spectrum of gamma radiation associated with the region of interest comprising at least one low-energy band and one high-energy band, each of the calibration spectra comprising at least the low-energy band, the high-energy band, and an energy band centered on an 1001 keV energy line of $^{234m}$Pa, the module for determining the calibration coefficients comprising:

a first calculation sub-module for calculating a first uranium content of the first calibration region and a second uranium content of the second calibration region using respectively the energy band centered on the 1001 keV energy line of $^{234m}$Pa of the first calibration energy spectrum of gamma radiation and of the second calibration energy spectrum of gamma radiation, respectively, a second calculation sub-module for calculating at least a first ratio and a second ratio between the surface area of the low-energy band and the surface area of the high-energy band respectively of the first calibration energy spectrum and of the second calibration energy spectrum, respectively, a third calculation sub-module for calculating the calibration coefficients from the at least first and second uranium contents and from the at least first and second ratios.

BRIEF SUMMARY OF THE DRAWINGS

The present disclosure will be better understood upon reading the following description, given only as an example and making reference to the drawings, amongst which.

DETAILED DESCRIPTION

Hereinafter in the description, the terms “mass content”, “mass concentration” and “content” are considered to be synonymous. Similarly, the terms "line", "energy line", "peak", "energy peak" are also considered to be synonymous.

Figure 1:
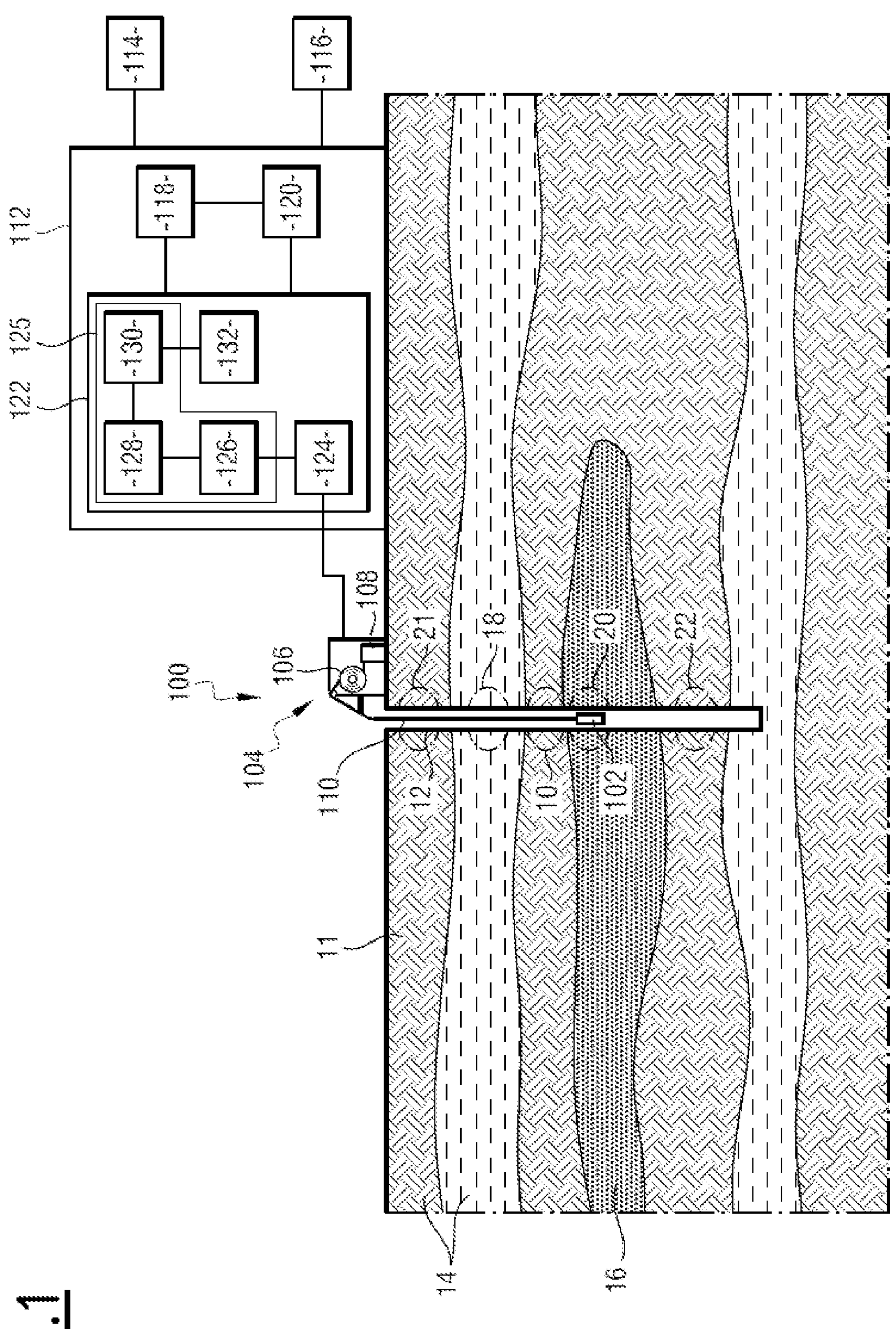
FIG. 1 is a schematic representation of a borehole and of a system according to a first embodiment of the present disclosure.

A system 100 for assessing the uranium content of at least one region of interest 10 of a subsoil 11 crossed through by a borehole 12 according to a first embodiment, is shown schematically in FIG. 1.

For simplicity, the borehole 12 is shown vertical in FIG. 1, i.e. with a dip equal to 90°. In a variant, the borehole 12 is not vertical and has an arbitrary dip and an arbitrary azimuth.

The borehole 12 is drilled through a plurality of geological formations 14. For example, the borehole 12 is made for exploration purposes in search of a possible uranium deposit 16. In a variant, the borehole 12 is made for the purpose of developing an identified deposit. The information collected in the borehole 12 is then used to estimate the reserves of uranium of the deposit 16.

With reference to FIG. 1, the borehole 12 crosses, in particular, through at least a first region 18, called the first calibration region, and a second region 20, called the second calibration region.

The borehole 12 also crosses through at least one reference region 21, e.g. situated above the first calibration region 18.

The reference region 21 is a non-mineralized region. "Non-mineralized region" refers to a region wherein the uranium content is low, below a reference threshold.

The reference threshold is comprised e.g. between 10 ppm and 50 ppm.

The first calibration region 18 has a first uranium content $Cm_{U1}$. The second calibration region 20 has a second uranium content $Cm_{U2}$.

Preferentially, the first calibration region 18 and the second calibration region 20 are mineralized regions. "Mineralized region" refers to a region wherein the uranium content is greater than the reference threshold, preferentially greater than a multiple of the reference threshold.

The multiple is e.g. equal to 2, 3, 4 or 5.

Hereinafter in the description, it should be understood that the contents of the different calibration regions 18, 20 and/or region of interest 10 correspond to average uranium contents for said regions considered.

The system 100 comprises a spectrometric probe 102 arranged to be inserted into the borehole 12 and a surface installation 104 enabling the spectrometric probe 102 to be displaced along the borehole 12 upwards and downwards according to the direction of the borehole. For example, the surface installation 104 comprises a winch 106 and a system 108 suitable for knowing the position of the spectrometric probe inside the borehole 12, e.g. an encoder wheel. The spectrometric probe 102 is connected by a cable 110 to the surface installation 104. The cable 110 serves both to move the spectrometric probe 102 inside the borehole 12, to supply electrical power to the spectrometric probe 102 and to transfer of the measurements made by the spectrometric probe 102.

Figure 2:
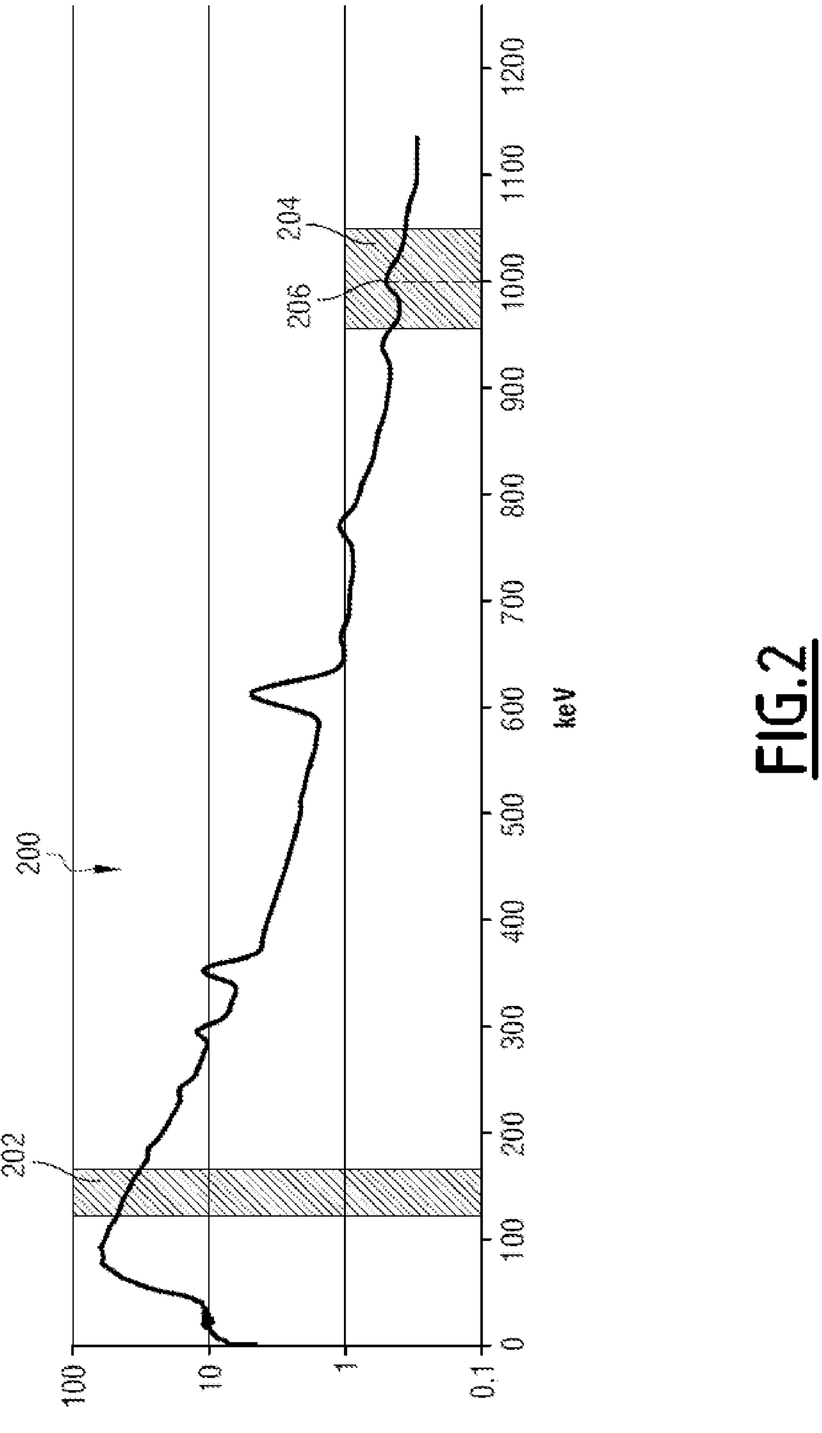
FIG. 2 is an example of gamma radiation spectrum acquired by the acquisition module of the system shown in FIG. 1.

The spectrometric probe 102 comprises a scintillator detector suitable for acquiring an energy spectrum as shown in FIG. 2. The scintillator detector comprises e.g. a lanthanum bromide crystal ($LaBr_3$).

The system 100 comprises a computer 112 for assessing the uranium content of the region of interest 10 of the borehole 12, a display unit 114 connected to the computer 112 for displaying the results supplied by the computer and a human-machine interface 116 for controlling the system 100.

The calculator 112 comprises e.g. a database 118.

The database 118 is intended e.g. to record the results supplied by the calculator 112.

The computer comprises a processor 120 and a memory 122 receiving software modules. The processor 120 is apt to execute the software modules received in the memory 122, for calculating the uranium content of the region of interest 10.

The memory comprises an acquisition module 124 and a module for assessing the uranium content 132.

In the first embodiment, the memory 122 further comprises a module for determining the calibration coefficients 125. Said module 125 comprises a first calculation sub-module 126, a second calculation sub-module 128 and a third calculation sub-module 130.

The acquisition module 124 is configured to acquire at least a first energy spectrum of radiation. More particularly, by using the surface installation 104, the acquisition module 124 serves to acquire an energy spectrum of radiation from the region of interest 10 of the borehole 12. In the first embodiment, the acquisition module 124 is also configured to acquire an energy spectrum of radiation from the first calibration region 18 and from the second calibration region 20.

The spectrometric probe 102 is connected to the acquisition module 124 by the cable 110.

FIG. 2 shows an example of the energy spectrum 200 acquired by the acquisition module 124.

The energy spectrum 200 represents the gamma count as a function of the energy of the radiation. Gamma counting is usually expressed in counts per second. The energy of the radiation is usually expressed in kilo-electron volts (keV).

Each energy spectrum 200 comprises at least one low-energy band 202 and one high-energy band 204.

The low-energy band 202 is a band strongly impacted by the self-attenuation of uranium unlike the high-energy band 204 which is little or not impacted by the self-attenuation. In other words, the contribution of the uranium self-attenuation in the low-energy band 202 is greater than the contribution of the uranium self-attenuation in the high-energy band 204.

The self-attenuation of the uranium of interest for the present disclosure occurs when a photon emitted by uranium or one of the daughter elements thereof interacts by Compton diffusion in the matrix of the material from which the photon is emitted and is absorbed by the photoelectric effect. The photon interacts with atoms met on the trajectory of the photon. The scattered photon is then absorbed even before reaching the scintillator detector.

Preferentially, the low-energy band 202 is chosen so that the contribution of the uranium self-attenuation in the energy band considered is the main contribution.

Preferentially, the contribution of the uranium self-attenuation in the second high-energy band 204 is substantially zero. "Substantially zero" preferentially refers to less than 1%, e.g. less than 0.2%.

The low-energy band 202 comprises a lower bound and an upper bound. The lower bound is greater than 98 keV, so as to prevent a contribution of uranium fluorescence X-rays in the low-energy band 202 which would compensate for the uranium self-absorption described hereinabove.

Uranium fluorescence X-rays correspond to the emission of a fluorescence photon that occurs as a result of a reorganization of the electron cloud of an atom when the latter totally absorbs an incident photon.

Advantageously, the energy ranges of the low-energy bands 202 and high-energy bands 204 are chosen so that the ratio between the surface area of the low-energy band $C_{BE}$ and the surface area of the high-energy band $C_{HE}$, called the indicator $K_{APC}$, is as independent as possible of the imbalance of uranium.

It is recalled that secular equilibrium is a situation where the activity of a radioisotope remains constant because the rate of production thereof (due to the decay of a parent isotope) is equal to the rate of disintegration thereof. Otherwise, one speaks of radioactive imbalance. In the present application, the radioactive imbalance of uranium refers to the average imbalance observed on the one hand between radon $^{222}Rn$ and uranium $^{238}U$ due to the volatility of radon, and on the other hand between radium $^{226}Ra$ (parent of radon $^{222}Rn$) and uranium $^{238}U$ due to the differential leaching between uranium and radium.

By modeling, the inventors have identified two optimal energy ranges for which the contribution of the uranium group is identical.

Thereby, advantageously, the low-energy band 202 is substantially comprised between 120 keV and 170 keV and the high-energy band 204 is substantially comprised between 960 keV and 1046 keV. "Substantially" means that the lower and upper bounds of the energy bands 202, 204 can vary with the resolution of the scintillator detector which influences the width at mid-height of the peaks. The variation is e.g. +/−1 keV. In the remainder of the description, the indicator $K_{APC}$ is defined as follows:

$$K_{APC} = \frac{C_{BE}}{C_{HE}}$$

$C_{BE}$ is the surface area of the low-energy band 202.

$C_{HE}$ is the surface area of the high-energy band 204.

The surface areas of the low-energy band $C_{BE}$ and of the high-energy band $C_{HE}$ correspond to the raw surface areas without any correction of the Compton continuous background.

Preferentially, at least the energy spectrum of radiation from the first calibration region 18 and the energy spectrum of radiation from the second calibration region 20 comprise an energy band 206 centered on a 1001 keV energy line of $^{234m}Pa$. Preferentially, each energy spectrum, including the radiation spectrum of the region of interest 10 comprises the energy band 206 centered on the 1001 keV energy line of $^{234m}Pa$. The 1001 keV line has the advantage of being located at the top of the $^{238}U$ chain, and hence of being independent of the imbalance of the chain. Nevertheless, the intensity of emission of said radiation is 0.83%, which, in the case of U/Ra imbalance and low uranium content, may require a long counting time, e.g. several tens of minutes or a few hours, in order to be detected.

The assessment module 132 for the uranium content is configured to assess the uranium content of the region of interest 10 using the surface area $C_{BE}$ of the low-energy band 202, the surface area of $C_{HE}$ of the high-energy band 204 of the spectrum acquired in the region of interest and at least two calibration coefficients, as will be seen further in the description.

The module 125 for determining the calibration coefficients is configured to determine the calibration coefficients.

The first calculation sub-module 126 is configured to calculate a first uranium content $Cm_{U1}$ of the first calibration region 18 and a second uranium content $Cm_{U2}$ of the second calibration region 20 using the energy band 206 centered on the 1001 keV energy line of $^{234m}Pa$ of the first calibration energy spectrum of gamma radiation and of the second calibration energy spectrum of gamma radiation, respectively.

The second calculation sub-module 128 is configured to calculate at least a first ratio $C_{BE1}/C_{HE1}$ and a second ratio $C_{BE2}/C_{HE2}$ between the surface area of the low-energy band $C_{BE1}$, $C_{BE2}$ and the surface area of the high-energy band $C_{HE1}$, $C_{HE2}$, of the first calibration energy spectrum and of the second calibration energy spectrum, respectively.

The third calculation sub-module 130 is configured to calculate a first coefficient α and a second coefficient β from the at least first and second uranium contents $Cm_{U1}$, $Cm_{U2}$ and from the at least first ratio $C_{BE1}/C_{HE1}$ and second ratio $C_{BE2}/C_{HE2}$.

Modules and sub-modules 124, 125, 126, 128, 130, 132 are programmed to implement the method according to the present disclosure, described hereinafter.

Figure 3:
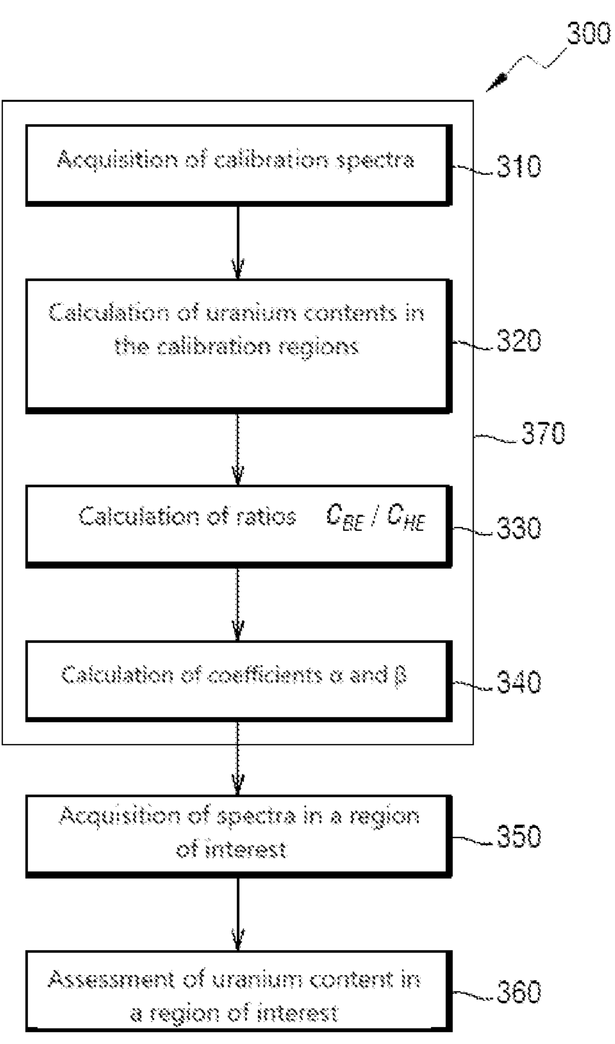
FIG. 3 is a schematic representation of the method according to a first embodiment of the present disclosure.

FIG. 3 shows the steps of a method 300 for assessing the uranium content of at least one region of interest 10 of a subsoil 11 using a borehole 12 according to a first embodiment of the present disclosure.

The method 300 comprises a step 350 of acquiring at least one energy spectrum of gamma radiation associated with the region of interest 10. The energy spectrum comprises at least the low-energy band 202 and the high-energy band 204.

The low-energy bands 202 and high-energy bands 204 are chosen as explained hereinabove.

Preferentially, the method 300 comprises the acquisition 350 of a plurality of gamma radiation energy spectra along the length of the borehole 12. For example, the method 300 comprises the acquisition of an energy spectrum in a plurality of regions of interest 10 spaced by a predetermined step. The predetermined step is comprised e.g. between 50 cm and 2 m.

The method then includes a step of assessing 360 the uranium content of the region of interest 10 using the surface area of the low-energy band 202, the surface area of the high-energy band 204 of the energy spectrum acquired in the region of interest 10 and at least two calibration coefficients.

Preferentially, the method 300 comprises a step 370 of determining the calibration coefficients.

In the example shown in FIG. 3, the step of determining the coefficients 370 is performed before the step of acquiring 350 the energy spectrum in the region of interest 10. However, in a variant, the step of determining the coefficients 370 can be performed after the step of acquiring 350 the energy spectrum in the region of interest 10.

In the first embodiment, the step of determining the calibration coefficients 370 is carried out in the borehole and in particular in the borehole 12 crossing through the region of interest 10.

In the example illustrated, the step of determining the calibration coefficients 370 first of all comprises a step of acquiring 310 using the installation 104 and the module 124 for acquiring at least a first and a second energy spectra of calibration gamma radiation in the first and second, calibration regions 18, 20, respectively of borehole 12.

Each of the first and second calibration gamma radiation energy spectra comprises at least the low-energy band 202, the high-energy band 204, and the energy band 206 centered on the 1001 keV energy line, as shown e.g. in FIG. 2.

The low-energy bands 202 and high-energy bands 204 are chosen as explained hereinabove.

Preferentially, the acquisition time of the first and second energy spectra is between a few tens of minutes and several hours, e.g., depending on the uranium content and the time required to detect the line at 1001 keV.

Advantageously, the first and second calibration regions 18, 20 are identified during a preliminary step of identifying the first and second calibration regions 18, 20.

For example, the method 300 comprises a preliminary step of identification by measuring the total gamma radiation count along the borehole 12. To this end, a radiometric probe for measuring the gamma radiation by total counting is moved in the borehole 12.

More particularly, such preliminary step comprises the identification of a non-mineralized reference region 21 with a uranium content below the reference threshold. The reference region 21 has a reference gamma count.

The first calibration region 18 and the second calibration region 20 are then identified as regions having a gamma count rate significantly greater than the reference gamma count, i.e. greater than a multiple of the reference gamma count.

The first calibration region 18 and the second calibration region 20 are preferentially chosen so that same have a different indicator $K_{APC}$, i.e. a different ratio between the surface area $C_{BE}$ of the low-energy band 202 and the surface area $C_{HE}$ of the high-energy band 204.

The step of determining the coefficients then comprises a step 320 of calculating a first uranium content $Cm_{U1}$ of the first calibration region 18 and a second uranium content of $Cm_{U2}$ of the second calibration region 20 using the energy band 206 centered on the 1001 keV energy line of $^{231m}$Pa of the first calibration energy spectrum of gamma radiation and of the second calibration energy spectrum of gamma radiation acquired in the first and second calibration regions 18, 20, respectively.

More particularly, the uranium content, denoted by $Cm_U$, is expressed from the net surface area of the 1001 keV line, denoted by $S_{1001}$, by the following equation:

$$Cm_U(1001\text{ keV}) = \frac{(1+\eta)\times 10^6 \times M({}^{238}_{92}U)\times T_{\frac{1}{2}}({}^{238}_{92}U)\times S_{1001}}{Eff_{1001keV}\times I_{1001keV}({}^{234m}_{91}Pa)\times Tc\times M_{samp}\times Na\times ln(2)} = \frac{S_{1001}}{K_{1001}}$$

$K_{1001}$ Is a calibration coefficient for changing from a value of net surface area at 1001 keV to the uranium content. The calibration coefficient depends in particular on the scintillator detector and is obtained by numerical simulation, experimentally using reference wells or standard blocks.

$\eta$ is the mass traction $^{235}$U/$^{238}$U in natural uranium (=0.72).

$$M({}^{238}_{92}U)$$

is the molar mass of $^{238}$U $$T_{\frac{1}{2}}({}^{238}_{92}U)$$

is the radioactive half-life of $^{238}$U

Na is Avogadro's number.

$Eff_{1001kev}$ is the efficiency of the scintillator detector at 1001 keV.

$$I_{1001keV}({}^{234m}_{91}Pa)$$

is the intensity of emission of $^{234m}$Pa at 1001 keV.

Tc is the counting time.

$M_{samp}$ is the weight of the sample.

The net surface areas are obtained after subtraction of the Compton continuous background, e.g. carried out using a software for processing energy spectra.

The step of determining the calibration coefficients 370 then comprises the calculation 330 of at least a first ratio $C_{BE1}/C_{HE1}$ and a second ratio $C_{BE2}/C_{HE2}$ between the surface area $C_{BE1}$, $C_{BE2}$ of the low-energy band 202 and the surface area $C_{HE1}$, $C_{HE2}$ of the high-energy band 204 of the first calibration energy spectrum and of the second calibration energy spectrum, respectively.

Figure 4:
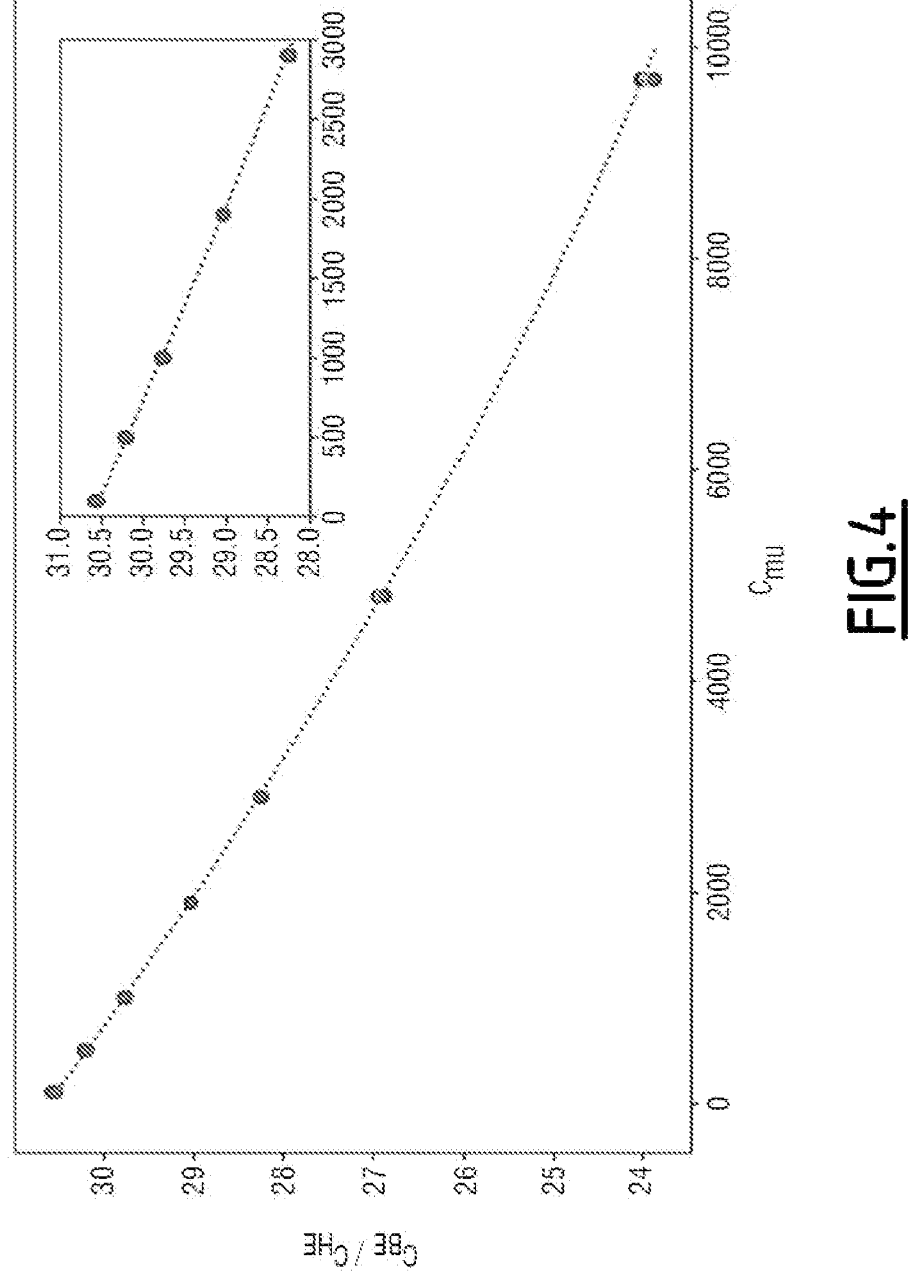
FIG. 4 shows the relationship between the ratio $C_{BE}/C_{HE}$ and the uranium content for different imbalances and, in the insert, an enlargement for contents between 0 and 3000 ppm.

FIG. 4 shows a modeling of the variation of the ratio $C_{BE}/C_{HE}$ depending upon to uranium content $Cm_U$ and for different imbalances. It can be seen that the ratio is independent of the imbalance. Henceforth, for uranium contents less than 5000 ppm, the uranium content is related to the ratio between the surface area of the low-energy band and the surface area of the high-energy band by a polynomial equation of first degree with the following form:

$$K_{APC} = \frac{C_{BE}}{C_{HE}} = \beta - \alpha \times Cm_U$$

$\alpha$ and $\beta$ are two calibration coefficients.

Thereby, the step of determining the calibration coefficients 370 consists, on the basis of the surface areas $C_{BE}$ and $C_{HE}$, of each of the first and second energy spectra and of the corresponding uranium contents $Cm_{U1}$ $Cm_{U2}$ calculated beforehand, in calculating 340 the values of the coefficients $\alpha$ and $\beta$.

In the example, the above leads to solving a system of two equations with two unknowns $\alpha$ and $\beta$.

The uranium content $Cm_U$ in the region of interest 10 is calculated using the surface area $C_{BE}$ of the low-energy band 202 and the surface area $C_{HE}$ of the high-energy band 204 of the energy spectrum acquired in the region of interest 10, the first and second coefficients calculated $\alpha$, $\beta$. The uranium content $Cm_U$ is calculated, more particularly, with the equation:

$$Cm_U = \frac{\beta - K_{APC}}{\alpha}$$

with $$K_{APC} = \frac{C_{BE}}{C_{HE}}$$

According to a particular embodiment, the method 300 comprises the acquisition of a third energy spectrum of gamma radiation in a third calibration region 22 of the borehole 12.

For example, the third calibration region 22 is a mineralized region distinct from the first calibration region 18 and from the second calibration region 20.

The third calibration region 22 is preferentially selected in a way similar to the first calibration region 18 and to the second calibration region 20.

For example, the first calibration region 18 is situated above the second calibration region 20 along the direction of the borehole 12. The third calibration region 22 is situated below the second calibration region 20.

The method 300 then comprises the acquisition of a third energy spectrum of gamma radiation in the third calibration region 22 and the calculation of the uranium content $Cm_{U3}$ in the third region 22 using the net surface area of the energy band 206 centered on the 1001 keV energy line of $^{234m}Pa$ of the spectrum, as explained hereinabove.

The method 300 then also comprises the calculation of at least a third ratio $C_{BE3}/C_{HE3}$ between the surface area $C_{BE3}$ of the low-energy band 202 and the surface area $C_{HE3}$ of the high-energy band 204 of the third calibration energy spectrum.

The coefficients α and β are calculated from the calculated uranium contents, $Cm_{U1}$, $Cm_{U2}$, $Cm_{U3}$ for each of the calibration regions 18, 20, 22 and the surface areas, $C_{BE1}$, $C_{BE2}$, $C_{BE3}$ of the low-energy bands 202 and high-energy bands 204, and more particularly the ratios, $C_{BE1}/C_{HE1}$, $C_{BE2}/C_{HE2}$, $C_{BE3}/C_{HE3}$ of each of the first, second and third energy spectra.

Preferentially, the first coefficient α and the second coefficient β are calculated by linear regression of the at least first, second and third calculated ratios, $C_{BE1}/C_{HE1}$, $C_{BE2}/C_{HE2}$, $C_{BE3}/C_{HE3}$ and of the at least first, second and third calculated uranium contents $Cm_{U1}$, $Cm_{U2}$, $Cm_{U3}$.

In another variant, the method 300 comprises the acquisition of calibration energy spectra in any number of calibration regions.

In addition or in a variant, in each of the calibration regions 18, 20, 22, a plurality of calibration energy spectra is acquired and steps 320 and 330 are performed on each of said calibration spectra.

In this way it is possible to assess an uncertainty associated with the uranium content(s) in the region(s) of interest by the method 300 by plotting a calibration curve representing the multiple pairs ($C_i$; $C_{BEi}/C_{HEi}$) from which it is possible to estimate uncertainty on the coefficients α and β of the linear regression.

In a variant, the uranium content of the region of interest 10 is related to the ratio between the surface area of the low-energy band 202 and the surface area of the high-energy band 204 by a polynomial equation of the second degree of the form $C_{BE}/C_{HE}=\alpha'\times C_{mU}^2-\beta'\times C_{mU}+\gamma'$. Indeed, in FIG. 4, for uranium contents greater than 5000 ppm, a deviation from the linearity is observed, which can be modeled by an equation of second degree.

The calibration coefficients α' β' and γ' are determined e.g. from energy spectra acquired in at least three calibration regions 18, 20, 22 and by polynomial regression.

According to a second embodiment (not shown), the step of determining the calibration coefficients 370 (polynomial equation of the first or second order) is carried out by modeling using e.g. a code modeling the interactions between the material and the different radiations. The code used is e.g. the Monte-Carlo N-Particle (MCNP) [MCNP6TM, User's manual—Version 1.0—LA-CP-13-00634, Rev. 0—May 2013—Denise B. Pelowitz, editor Los Alamos National Laboratory].

In a variant, the step of determining the calibration coefficients 370 is carried out using calibration blocks. Calibration blocks are blocks, e.g. concrete blocks, with a known uranium content. To determine the calibration coefficients, the spectrometric probe 102 is inserted into different calibration blocks, at least one energy spectrum of gamma radiation is acquired in each of the calibration blocks and the calibration coefficients are determined in a way similar to what is done in the first embodiment.

Thereby, the method 300 according to the present disclosure serves to reliably assess the low uranium contents of the underground formations in a borehole, in particular in the presence of strong radioactive U/Ra imbalances in uranium, typically very much lower than 1.

What is claimed is:

1. A method for assessing a uranium content of at least one region of interest of a subsoil using gamma spectrometry, the region of interest being crossed through by a borehole, the method comprising the following steps:

acquiring at least one energy spectrum of gamma radiation associated with the region of interest, the energy spectrum comprising at least one low-energy band, one high-energy band, a contribution of a self-attenuation of uranium in the low-energy band being greater than a contribution of a self-attenuation of uranium in the high-energy band; and assessing the uranium content in the region of interest using a surface area of the low-energy band, the surface area of the high-energy band of the energy spectrum acquired in the region of interest and at least two calibration coefficients, wherein the low-energy band comprises a lower bound and an upper bound, the lower bound being greater than 98 keV so as to avoid a contribution from uranium fluorescence X-ray radiation in the low-energy band.

2. The method according to claim 1, wherein the contribution of the uranium self-attenuation in the low-energy band is the main contribution in said low-energy band.

3. The method according to claim 1, wherein the contribution of the uranium self-attenuation in the high-energy band is substantially zero.

4. The method according to claim 1, wherein the low-energy band is between 120 keV and 170 keV and the high-energy band is comprised between 960 keV and 1046 keV.

5. The method according to claim 1, wherein the uranium content in the region of interest is related to a ratio between the surface area of the low-energy band and the surface area of the high-energy band by a polynomial equation of first degree in the form $CB_6/CHE=\beta-\alpha\times C_{mU}$ or by a polynomial equation of second degree in the form $C_{BE}/C_{HE}=\alpha'\times C_{mU}^2-\beta'\times C_{mU}+\gamma'$, $C_{BE}$ being the area of the low-energy band of the energy spectrum, $C_{HE}$ being the area of the high-energy band of the energy spectrum, $C_{mU}$ being the uranium content, α, β, α', β', γ' being the calibration coefficients.

6. The method according to claim 1, comprising a step of determining the calibration coefficients by modeling or by means of calibration blocks.

7. The method according to claim 1, comprising a step of determining calibration coefficients in a borehole, the subsoil comprising at least a first calibration region and a second calibration region crossed through by the borehole, said determination step comprising:

acquiring at least a first and a second calibration gamma radiation energy spectra in the first and second calibration regions, respectively, each of the calibration energy spectra comprising at least one low-energy band, one high-energy band, and an energy band centered on a 1001 keV energy line of 234 mPa;

calculating a first uranium content in the first calibration region and a second uranium content in the second calibration region using the energy band centered on the 1001 keV energy line of 234 mPa of a first calibration energy spectrum of gamma radiation and of a second calibration energy spectrum of gamma radiation, respectively;

calculating at least a first ratio and a second ratio between the surface area of the low-energy band and the surface area of the high-energy band of the first calibration energy spectrum and of the second calibration energy spectrum, respectively; and calculating the calibration coefficients from the at least first and second uranium contents calculated and from the at least first and second ratios calculated.

8. The method according to claim 1, wherein the uranium content in the region of interest is assessed using the surface areas of only two energy bands of the energy spectrum acquired in the region of interest.

9. The method according to claim 1, wherein in the energy spectrum acquired in the region of interest, the low energy band and the high energy band do not have an intersection and are entirely separated from one another.

10. The method according to claim 5, wherein the polynomial equation does not take into account the area of an energy band of the energy spectrum acquired in the region of interest other than $C_{BE}$ and $C_{HE}$.

11. A system for assessing a uranium content of a region of interest of a subsoil using gamma spectrometry, the region of interest being crossed through by a borehole, the system comprising:

a spectrometric probe including a scintillator detector;

an acquisition module connected to the spectrometric probe, the acquisition module being configured to acquire at least one energy spectrum of gamma radiation associated with the region of interest, the energy spectrum comprising at least one low-energy band, one high-energy band, a contribution of a self-attenuation of uranium in the low-energy band being greater than a contribution of a self-attenuation of uranium in the high-energy band; and an assessment module of the uranium content configured to assess the uranium content of the region of interest using a surface area of the low-energy band, the surface area of the high-energy band of the acquired energy spectrum in the region of interest and at least two calibration coefficients, wherein the low-energy band comprises a lower bound and an upper bound, the lower bound being greater than 98 keV so as to avoid a contribution from uranium fluorescence X-ray radiation in the low-energy band.

12. The system according to claim 11, further comprising a calibration coefficient determination module configured to determine the calibration coefficients, the subsoil comprising at least a first calibration region and a second calibration region crossed through by the borehole, the acquisition module being configured to acquire at least a first calibration energy spectrum of gamma radiation associated with the first calibration region, a second calibration spectrum associated with the second calibration region and an energy spectrum of gamma radiation associated with the region of interest comprising at least a low-energy band and a high-energy band, each of the calibration spectra comprising at least the low-energy band, the high-energy band, and an energy band centered on a 1001 keV energy line of 234 mPa, the module for determining calibration coefficients comprising:

a first calculation sub-module for calculating a first uranium content of the first calibration region and a second uranium content of the second calibration region using the energy band centered on the 1001 keV energy line of the 234 mPa of the first calibration energy spectrum of gamma radiation and the second calibration energy spectrum of gamma radiation, respectively;

a second calculation sub-module for calculating at least a first ratio and a second ratio between the surface area of the low-energy band and the surface area of the high-energy band of the first calibration energy spectrum and of the second calibration energy spectrum, respectively; and a third calculation sub-module for calculating the calibration coefficients from the at least first and second uranium contents and the at least first and second ratios.

* * * * *